Patented Oct. 6, 1953

2,654,757

UNITED STATES PATENT OFFICE 2,654,757

2-ETHYLAMINO DERIVATIVES OF 1,2,3,4-TETRAHYDRONAPHTHOL

John Frank Lontz, Wilmington, Del., assignor to American Cyanamid Company, New York, N. Y., a corporation of Maine No Drawing. Application September 10, 1951, Serial No. 245,974

6 Claims. (Cl. 260—294.7)

This invention relates to new organic compounds and their preparation. More particularly, it relates to alkamine derivatives of tetrahydronaphthalene containing a hydroxy group in the 1-position and an amine substituent in the 2-position of the saturated ring. The compounds of the present invention may be illustrated by the following general formula

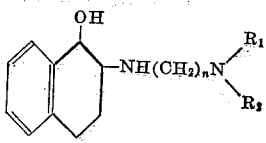

in which $n$ is an integer larger than 1 and smaller than 4, and $R_1$ and $R_2$ represent hydrogen or alkyl radicals of from 2 to 4 carbon atoms, inclusive, and $R_1$ and $R_2$ together with the nitrogen represent a heterocyclic ring.

In general, the compounds of the present invention are viscous, high-boiling liquids which may be distilled under vacuum. These products are not readily soluble in water and become discolored on standing, but may be treated with acids such as hydrochloric acid to form addition salts of greater stability. For the purpose of characterization and testing, I have converted these amines to their hydrochlorides.

Although the present invention is not limited to any method of preparation, I prefer to produce these new compounds by brominating tetrahydronaphthalene in the saturated ring to form the 1,2 dibromide. The alpha-bromine is then hydrolyzed under mild conditions and the corresponding bromohydrin reacted with the diamine to obtain the desired product. The following examples show in greater detail the preparation of illustrative 2-amino derivatives of 1,2,3,4-tetrahydronaphthol:

EXAMPLE 1

1-hydroxy-2-(β-aminoethylamino)-1,2,3,4-tetrahydronaphthalene

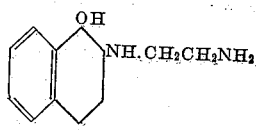

Two hundred sixty-four grams (2.0 mols) of tetrahydronaphthalene were placed in a one-liter, three-necked flask, equipped with a stirrer, return condenser, and a dropping funnel. While the contents of the flask were being stirred and heated on a steam bath, 640 grams (4 mols) of bromine were added dropwise for a period of three hours. After the addition was completed, the reaction mixture was stirred and heated for an additional hour. The reaction mixture was then cooled and poured, with vigorous stirring, into one liter of ice water. The resulting yellow, pasty mass was washed several times with cold water to remove most of the hydrobromic acid; it was extracted with ether, and the ether extract dried over sodium sulfate. Most of the ether was removed on a steam bath and upon cooling in an ice bath, the dibromide precipitated out as a yellow solid. This crude product was filtered and dissolved in about 100 cc. of chloroform, thoroughly cooled and precipitated out by adding three volumes of ethyl alcohol. After filtering off the dibromide, another portion of ethyl alcohol was added to the mother liquor, and an additional amount of the dibromide was obtained. The product, after being filtered and finally dried on a porous plate, was found to be sufficiently pure for the succeeding reaction involving the hydrolysis of the alpha-bromine. The dibromide may be further purified if desired, by crystallization from boiling benzene; in this manner, it is obtained in the form of almost white, small prisms which melt at 70° C. The yield of the crude product was about 45 percent of the theoretical. The other products were found to be naphthalene and a mixture of the isomeric aromatic bromides of tetrahydronaphthalene.

Forty grams (0.14 mol) of the dibromo-tetrahydronaphthalene were dissolved in 500 cc. of acetone in a one-liter, three-necked flask, equipped with a reflux condenser and a stirrer. Water was then added to the solution until slight turbidity had been attained; 20 grams (0.23 mol) of finely pulverized magnesium carbonate was added. The mixture was heated on a water bath maintained at 60° for seven hours during constant stirring. The mixture was then filtered while still warm, and the filtrate concentrated on a steam bath until a red-brown oil settled out. The resulting mass was treated with one liter of ice water with vigorous stirring, whereupon a yellow, granular product separated out. This bromohydrin was suitable for reaction with amines in the preparation of amino alcohols. The yield was approximately 90 percent of the theoretical.

Nine and one-tenth grams (0.40 mol) of this bromohydrin and 9.4 grams (0.120 mol) of ethylene diamine were dissolved in 25 cc. of dry benzene and the mixture heated in a sealed tube for 24 hours at a temperature of 120–125°. The contents of the tube were extracted with dilute hydrochloric acid to remove the basic products from unreacted bromohydrin. The aqueous hydrochloric acid extract was made alkaline with concentrated potassium hydroxide solution, and the resulting dark oil extracted with ether. The ether extract was dried over sodium sulfate, and then concentrated in a small Claissen flask on a steam bath. The residue was distilled under diminished pressure in an atmosphere of hydrogen. The amino alcohol distilled as a pale yellow oil at 206–208° at 8 mm. The yield was about 75 percent of the theoretical.

As in the case of all the amino alcohols of this series, this compound darkened upon standing and consequently was preserved in the form of its hydrochloride.

To an absolute ether solution of the amino alcohol, cooled on an ice bath, was added dropwise a solution of dry hydrogen chloride in absolute ether until precipitation was complete. The resulting amorphous hydrochloride was collected on a filter and dried. It was hygroscopic.

EXAMPLE 2

*1-hydroxy-2-(β-diethylaminoethylamino)-1,2,3,4-tetrahydronaphthalene*

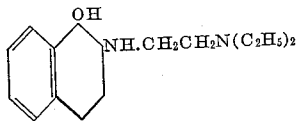

Thirty-two and five-tenths grams (0.143 mol) of the bromohydrin prepared according to Example 1 and 25 grams (0.215 mol) of beta-diethylaminoethylamine were dissolved in dry benzene and the mixture heated in a sealed tube for 48 hours at 120–125°. The contents of the tube were extracted with dilute hydrochloric acid to remove the basic products from the unreacted bromohydrin. The hydrochloric acid extract was made alkaline with concentrated potassium hydroxide solution, and the resulting dark oil extracted with ether. The ether extract was dried over sodium sulfate and the ether evaporated in a Claisen flask. The residue was distilled under diminished pressure in an atmosphere of hydrogen. The amino alcohol distilled as a pale yellow oil at 168–169° at 8 mm. The yield was about 65 percent of the theoretical. The hydrochloride of this amine was prepared by the method of Example 1.

EXAMPLE 3

*1-hydroxy - 2-(β-piperidinoethylamino) - 1,2,3,4-tetrahydronaphthalene*

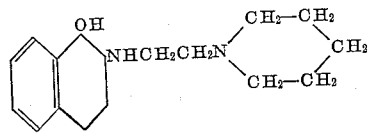

Six grams (0.0263 mol) of the bromohydrin prepared in Example 1 and 4.3 grams of beta-piperidinoethylamine (0.0394 mol) were dissolved in 40 cc. of dry benzene and the mixture was heated in a sealed tube for 24 hours at 120–125°. The contents of the tube were extracted with dilute hydrochloric acid, and the amino alcohol was obtained according to the procedure described above. The amino alcohol distilled as a viscous, pale yellow oil at 235–240° at 7.5 mm. The yield was about 70 percent of the theoretical.

This hydrochloride was precipitated from a solution of the amino alcohol in dry ether by treatment with an ether solution of dry hydrogen chloride. The salt was crystallized from a mixture of alcohol and ether (both anhydrous) and when so purified it melted at 213–214°. Like the other hydrochlorides of this series, this salt is very hygroscopic.

EXAMPLE 4

*1-hydroxy-2-(γ-piperidinopropylamino)-1,2,3,4-tetrahydronaphthalene*

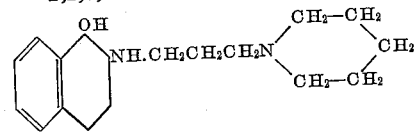

Fourteen and two-tenths grams (0.10 mol) of gamma-piperidinopropylamine and 15 grams (0.066 mol) of the tetralin bromohydrin of Example 1 were dissolved in 50 cc. of dry benzene and the mixture heated in a sealed tube for 24 hours at 120–125°. The contents of the tube were subjected to the usual procedure for the isolation of the amino alcohol. The amino alcohol distilled as a viscous, pale yellow oil at 205–207° at 5 mm. The yield was about 70 percent of the theoretical.

This hydrochloride was obtained by the usual procedure of precipitating the salt from a dry ether solution of the base. It is likewise amorphous, and very hygroscopic. When dried over solid potassium hydroxide in a vacuum desiccator, it was found to be analytically pure.

EXAMPLE 5

*1-hydroxy-2-(β-di-n-butylaminoethylamino)-1,2,3,4-tetrahydronaphthalene*

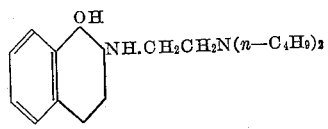

Five and five-tenths grams (0.024 mol) of the bromohydrin prepared according to the method described in Example 1 and 5.5 grams of beta-di-n-butylaminoethylamine (0.032 mol) were dissolved in 20 cc. of dry benzene, and the mixture was heated in a sealed tube for 72 hours at 120–125°. The contents of the tube were extracted with dilute hydrochloric acid, and the amino alcohol was obtained by the method described in the preceding experiment. The amino alcohol distilled as a viscous, pale yellow oil at 175–176° at 8 mm. The yield was better than 60 percent of the theoretical. The hydrochloride of this amino alcohol was prepared in the same manner as described in the preceding examples. Again, owing to the hygroscopic nature of the hydrochloride, no definite crystalline form could be obtained.

Pharmacological tests were carried out to determine the effect of these amino derivatives of tetrahydronaphthol on blood pressure and general metabolism. The effect on blood pressure was determined according to the standard pharmacological procedure on intact animals; in this instance, cats were used. The drugs were injected in various concentrations at intervals of 15 and 20 minutes. In the intervals between injections the blood pressure had returned to normal. The results show that these compounds have a depressor action on blood pressure.

The amino tetrahydronaphthol derivatives described herein were also tested as metabolic stimulants by determining the total metabolism in rats before and after administration of the drug for a period of three hours. The resulting increase in metabolic rate amounted to as much as 17.4 percent (dosage 100 mg./kg.).

I claim:

1. Compounds selected from the class consisting of bases having the formula:

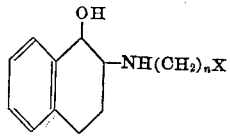

in which $n$ is an integer larger than 1 and smaller than 4 and X is a substituent selected from the group consisting of amino, di (lower alkyl) amino and piperidino radicals; and the acid addition salts of the bases with acids.

2. 1-hydroxy-2-($\beta$-aminoethylamino)-1,2,3,4-tetrahydronaphthalene.

3. 1-hydroxy-2-($\beta$-diethylaminoethylamino)-1,2,3,4-tetrahydronaphthalene.

4. 1-hydroxy-2-($\beta$-piperidinoethylamino)-1,2,3,4-tetrahydronaphthalene.

5. 1-hydroxy-2-($\gamma$-piperidinopropylamino)-1,2,3,4-tetrahydronaphthalene.

6. 1-hydroxy-2-($\beta$-di-n-butylaminoethylamino)-1,2,3,4-tetrahydronaphthalene.

JOHN FRANK LONTZ.

References Cited in the file of this patent

Chem. Abs., vol. 21, p. 566 (1927).

Ser. No. 361,888, Scheuing et al. (A. P. C.), published Apr. 20, 1943.